United States Patent
Matsuoka

(10) Patent No.: US 10,331,795 B2
(45) Date of Patent: Jun. 25, 2019

(54) METHOD FOR RECOGNIZING SPEECH SOUND, MOBILE TERMINAL, AND RECORDING MEDIUM

(71) Applicant: Panasonic Intellectual Property Corporation of America, Torrance, CA (US)

(72) Inventor: Tomomi Matsuoka, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 15/713,088

(22) Filed: Sep. 22, 2017

(65) Prior Publication Data

US 2018/0089175 A1   Mar. 29, 2018

(30) Foreign Application Priority Data

Sep. 28, 2016   (JP) .................................. 2016-190232
May 19, 2017   (JP) .................................. 2017-100139

(51) Int. Cl.
| | | |
|---|---|---|
| H04W 4/02 | (2018.01) | |
| G06F 17/27 | (2006.01) | |
| G06F 17/28 | (2006.01) | |
| G10L 15/00 | (2013.01) | |
| G10L 15/20 | (2006.01) | |
| G10L 15/22 | (2006.01) | |
| G10L 15/26 | (2006.01) | |
| G10L 17/22 | (2013.01) | |
| H04M 1/725 | (2006.01) | |

(52) U.S. Cl.
CPC .......... *G06F 17/289* (2013.01); *G06F 17/275* (2013.01); *G06F 17/2836* (2013.01); *G10L 15/005* (2013.01); *G10L 15/20* (2013.01); *G10L 15/22* (2013.01); *G10L 15/265* (2013.01); *G10L 17/22* (2013.01); *H04M 1/72572* (2013.01); *H04W 4/027* (2013.01)

(58) Field of Classification Search
CPC .... G06F 17/275; G06F 17/28; G06F 17/2836; G06F 17/289; G10L 15/20; G10L 15/22; G10L 15/26; G10L 15/265
See application file for complete search history.

(56) References Cited

U.S. PATENT DOCUMENTS

| | | | | |
|---|---|---|---|---|
| 6,999,932 | B1* | 2/2006 | Zhou | G06F 17/275 704/235 |
| 8,457,441 | B2* | 6/2013 | Joy | G06K 9/481 382/240 |
| 9,437,191 | B1* | 9/2016 | Chen | G10L 15/22 |

(Continued)

FOREIGN PATENT DOCUMENTS

WO   2015/029304   3/2015

*Primary Examiner* — Eric Yen
(74) *Attorney, Agent, or Firm* — Greenblum & Bernstein, P.L.C.

(57) ABSTRACT

Speech information including a speech sound uttered by a user is obtained. A language of the speech sound included in the obtained speech information is recognized. A first determination for determining whether the recognized language is a first language registered to a memory in advance is made. If it is determined as a result of the first determination that the recognized language is the first language, the speech sound is translated into a second language, which is different from the first language.

10 Claims, 15 Drawing Sheets

(56) References Cited

U.S. PATENT DOCUMENTS

| | | | |
|---|---|---|---|
| 9,639,528 B1* | 5/2017 | Hoffmann | G06F 9/454 |
| 9,697,824 B1* | 7/2017 | Chen | B60R 16/0373 |
| 9,953,631 B1* | 4/2018 | Cuthbert | G10L 15/005 |
| 2003/0163300 A1* | 8/2003 | Kasvand | G06F 17/275 |
| | | | 704/2 |
| 2004/0122677 A1* | 6/2004 | Lee | G06F 17/289 |
| | | | 704/277 |
| 2005/0055630 A1* | 3/2005 | Scanlan | G06F 17/289 |
| | | | 715/234 |
| 2005/0171664 A1* | 8/2005 | Konig | G10L 15/22 |
| | | | 701/36 |
| 2006/0080079 A1* | 4/2006 | Yamabana | G06F 17/289 |
| | | | 704/2 |
| 2009/0132230 A1* | 5/2009 | Kanevsky | G06F 17/289 |
| | | | 704/2 |
| 2009/0265175 A1* | 10/2009 | Fang | G06F 17/289 |
| | | | 704/277 |
| 2009/0326914 A1* | 12/2009 | Joy | G06F 17/2223 |
| | | | 704/3 |
| 2011/0219080 A1* | 9/2011 | McWithey | H04M 1/72552 |
| | | | 709/206 |
| 2013/0185065 A1* | 7/2013 | Tzirkel-Hancock | G10L 15/20 |
| | | | 704/233 |
| 2014/0278416 A1* | 9/2014 | Schuster | G10L 17/00 |
| | | | 704/246 |
| 2014/0297254 A1* | 10/2014 | Yeo | G06F 17/289 |
| | | | 704/2 |
| 2014/0309920 A1* | 10/2014 | Ricci | H04W 4/21 |
| | | | 701/400 |
| 2015/0154183 A1* | 6/2015 | Kristjansson | G06F 17/289 |
| | | | 704/3 |
| 2015/0186359 A1* | 7/2015 | Fructuoso | G06F 17/289 |
| | | | 704/8 |
| 2015/0262577 A1 | 9/2015 | Nomura | |
| 2015/0356076 A1* | 12/2015 | Herrera | G06F 17/2818 |
| | | | 704/2 |
| 2016/0351051 A1* | 12/2016 | Murthy | G06K 9/00818 |
| 2017/0351665 A1* | 12/2017 | Kim | G06F 17/289 |
| 2017/0357639 A1* | 12/2017 | Zamor | G06F 17/289 |

* cited by examiner

METHOD FOR RECOGNIZING SPEECH SOUND, MOBILE TERMINAL, AND RECORDING MEDIUM

BACKGROUND

1. Technical Field

The present disclosure relates to a method for recognizing a speech sound, a mobile terminal, and a recording medium capable of recognizing a speech signal and translating a speech sound indicated by the speech signal into a language different from a language of the speech sound.

2. Description of the Related Art

A method for recognizing a speech sound used to determine whether a speech sound is intended for a device on the basis of text information recognized through speech recognition has recently been disclosed (refer to International Publication No. 2015/029304).

International Publication No. 2015/029304, however, requires further improvements.

SUMMARY

In one general aspect, the techniques disclosed here feature a method for recognizing a speech sound. The method includes obtaining speech information including a speech sound uttered by a user, recognizing a language of the speech sound included in the obtained speech information, making a first determination for determining whether the recognized language is a first language registered to a memory in advance, and translating, if it is determined as a result of the first determination that the recognized language is the first language, the speech sound into a second language, which is different from the first language.

According to this aspect, further improvements can be achieved.

It should be noted that these general or specific aspects may be implemented as a mobile terminal, a system, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
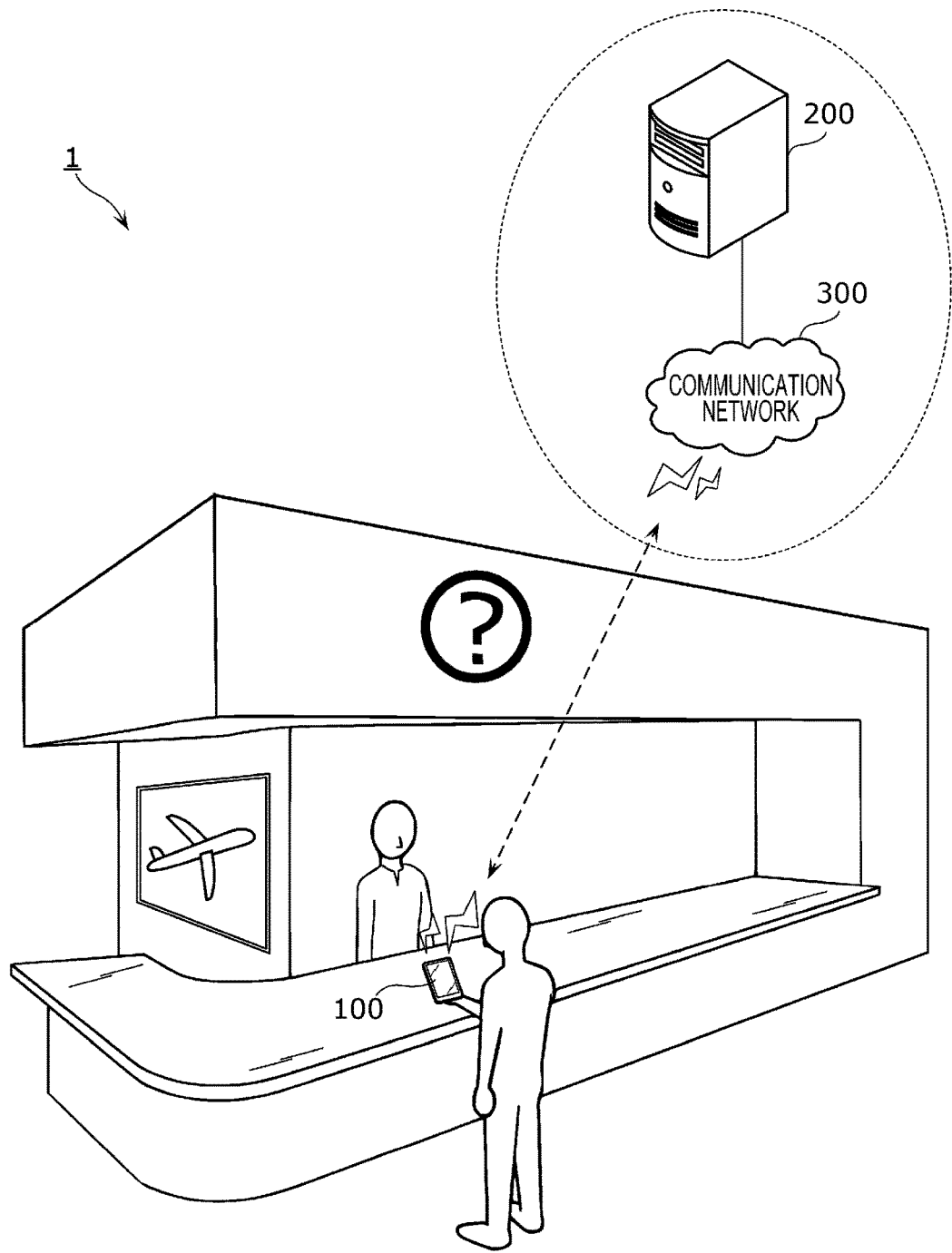
FIG. 1 is a schematic diagram of a translation system according to a first embodiment.

Underlying Knowledge Forming Basis of Present Disclosure

The present inventor has found that the method for recognizing a speech sound disclosed in International Publication No. 2015/029304 poses the following problem.

In the technique disclosed in International Publication No. 2015/029304, whether a speech sound is intended for a device is determined on the basis of text information recognized through speech recognition. If it is determined that a speech sound is intended for the device, an operation instruction indicated by the text information is executed. If not, the operation instruction is not executed. In the technique disclosed in International Publication No. 2015/029304, for example, a sentence pattern of text information is analyzed, and if the sentence pattern is an interrogative sentence or an imperative sentence, it is determined that a speech sound is intended for the device.

In a crowded place, however, there are a lot of speech sounds. That is, a lot of people might be uttering interrogative sentences and imperative sentences. In this case, speech sounds uttered by persons other than a user of the device might be recognized. The user usually desires to translate his/her speech sounds through speech recognition in a crowded place, such as an airport, a hotel, or a public transportation system. In this case, with the technique disclosed in International Publication No. 2015/029304, speech sounds uttered by persons other than the user might be recognized.

In the present disclosure, therefore, the following measures are taken to avoid recognition and translation of speech sounds uttered by persons other than a user of a device.

A method according to an aspect of the present disclosure includes obtaining speech information including a speech sound uttered by a user, recognizing a language of the speech sound included in the obtained speech information, making a first determination for determining whether the recognized language is a first language registered to a memory in advance, and translating, if it is determined as a result of the first determination that the recognized language is the first language, the speech sound into a second language, which is different from the first language.

As a result, since a speech sound is translated into the second language if a recognized language of the speech sound is the first language, erroneous detection can be reduced.

In addition, if a recognized language of a speech sound is not the first language, the speech sound need not be translated into the second language. In this case, for example, speech sounds uttered by persons other than the user are basically not recognized even in a crowded place. In particular, when the user needs translation, people around the user are usually not speaking in the user's mother tongue. In this case, if the user's mother tongue is set as the first language, for example, only the first language is translated. Erroneous detection, therefore, can be reduced even in a situation in which speech sounds uttered by persons other than the user can be erroneously detected, such as in a crowded place.

In addition, the method may further include receiving the first language input by the user, and registering the received first language to the memory. The first determination may be made after the registering.

In this case, the user can easily set the first language.

In addition, the method may further include detecting a position of a mobile terminal. If the recognized language is an official language of an area including the detected position, it is determined in the first determination that the recognized language is not the first language.

In this case, since an official language of an area including a current position is not detected as the first language, the official language of the area is not translated. As a result, speech sounds uttered by the user when translation is necessary can be translated. That is, when the user stays in an area in which the user's mother tongue is an official language, the user need not translate speech sounds uttered thereby. When the user stays in an area in which the user's mother tongue is not an official language, on the other hand, speech sounds in the official language of the area are not translated, and speech sounds uttered by persons other than the user are basically not recognized.

In addition, the method may further include making a second determination for determining whether the detected position is included in a second area, which is different from a first area in which the first language is the official language, and setting, if it is determined as a result of the second determination that the detected position is included in the second area, an official language of the second area is set as the second language.

In this case, the user can easily translate speech sounds uttered thereby into an official language of an area in which the user stays without setting the second language.

In addition, the method may further include detecting a position of a mobile terminal, obtaining notification information output from a certain application, making a third determination for determining on the basis of the detected position and the obtained notification information whether translation is necessary at a current position of the mobile terminal in a current state of the user, and performing, if it is determined as a result of the third determination that translation is necessary at the current position of the mobile terminal in the current state of the user, the first determination and the translation.

In this case, erroneous detection can be reduced in a situation in which speech sounds uttered by persons other than the user can be erroneously detected. The amount of processing, therefore, can be reduced.

In addition, a place where translation is necessary may be an airport, a hotel, a restaurant, a store, or a station.

In addition, it is determined in the third determination that translation is necessary at the current position of the mobile terminal in the current state of the user (1) if the detected position is an airport and the obtained notification information indicates that the user has checked in at the airport, (2) if the detected position is a hotel and the obtained notification information indicates that the user has checked in at the hotel, (3), if the detected position is a restaurant or a store and the obtained notification information indicates that the user has checked a coupon at the restaurant or the store, or (4) if the detected position is a station and the obtained notification information indicates that the user has gone through a gate at the station.

In addition, the method may further include detecting acceleration of a mobile terminal, making a fourth determination for determining on the basis of the detected acceleration whether the user carrying the mobile terminal is moving at a certain speed or higher, and performing, if it is determined as a result of the fourth determination that the user is not moving at the certain speed or higher, the first determination and the translation.

When the user is moving at the certain speed or higher, noise such as wind noise, frictional noise, and vibration noise is likely to be detected. Since the first determination and the translation process are not performed in this case, however, erroneous translation can be reduced.

In addition, the method may further include measuring a noise level around a mobile terminal, making a fifth determination for determining whether the measured noise level is higher than a certain noise level, and performing, if it is determined as a result of the fifth determination that the noise level is equal to or lower than the certain noise level, the first determination and the translation.

When noise is detected, the first determination and the translation process are not performed. As a result, erroneous translation can be reduced.

It should be noted that these general or specific aspects may be implemented as a system, a method, an integrated circuit, a computer program, a computer-readable recording medium such as a CD-ROM, or any selective combination thereof.

A method for recognizing a speech sound according to an aspect of the present disclosure will be specifically described hereinafter with reference to the drawings.

Embodiments that will be described hereinafter are specific examples of the present disclosure. Values, shapes, materials, components, arrangement positions and connection modes of the components, steps, the order of the steps, and the like are examples, and do not limit the present disclosure. Among the components described in the following embodiments, ones not described in the independent claims, which define broadest concepts, will be described as arbitrary components.

First Embodiment

A first embodiment will be described hereinafter with reference to FIGS. 1 to 6.

1-1. Configuration

FIG. 1 is a schematic diagram of a translation system 1 according to the first embodiment.

More specifically, FIG. 1 illustrates a mobile terminal 100, a server 200, and a communication network 300. The translation system 1 includes the mobile terminal 100 and the server 200, for example, among these components.

The translation system 1 is a system for translating speech sounds uttered by a user into a language different from a language of the speech sounds. More specifically, the mobile terminal 100 obtains a speech sound uttered by the user and transmits obtained speech information to the server 200. The server 200 recognizes a language of the speech sound included in the obtained speech information and transmits a result of the recognition to the mobile terminal 100. The mobile terminal 100 translates the speech sound included in the speech information into a language different from that of the speech sound in accordance with the received result of recognition.

1-1-1. Mobile Terminal

The hardware configuration of the mobile terminal 100 will be described with reference to FIG. 2.

Figure 2:
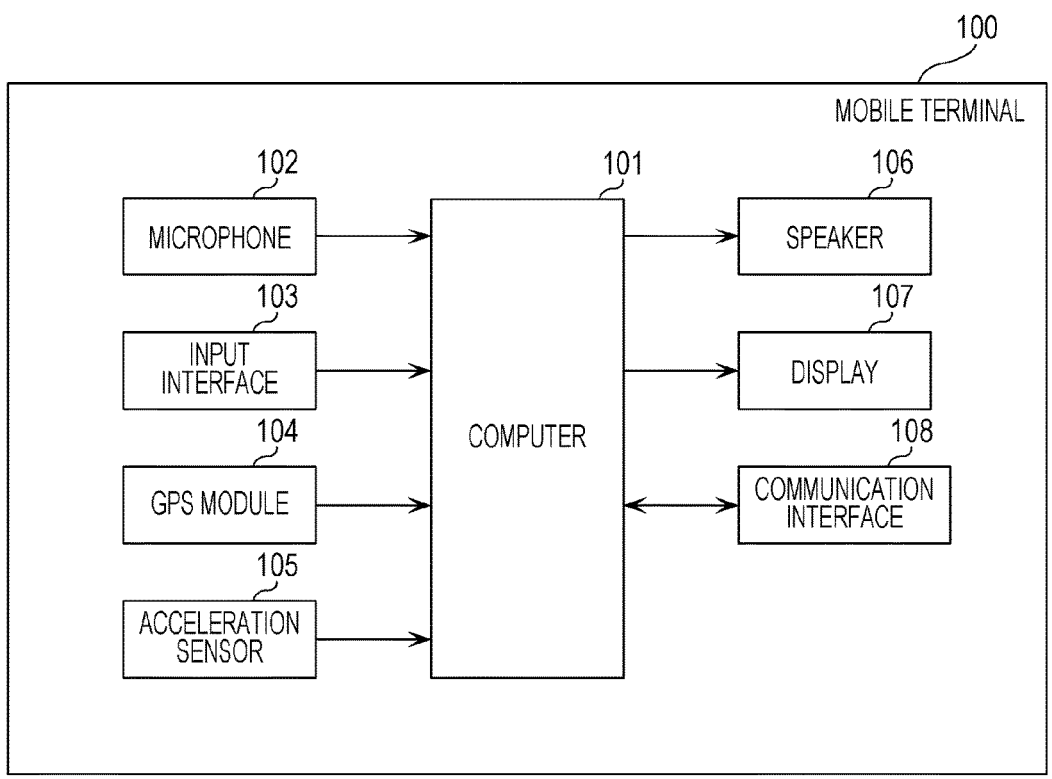
FIG. 2 is a block diagram illustrating an example of the hardware configuration of a mobile terminal according to the first embodiment.

FIG. 2 is a block diagram illustrating an example of the hardware configuration of the mobile terminal 100 according to the first embodiment.

As illustrated in FIG. 2, the mobile terminal 100 includes a computer 101, a microphone 102, an input interface 103, a global positioning system (GPS) module 104, an acceleration sensor 105, a speaker 106, a display 107, and a communication interface 108. The mobile terminal 100 is a communicable information terminal such as a smartphone or a tablet terminal.

The computer 101 includes a processor that executes control programs for operating the mobile terminal 100, a volatile storage area (main storage device) used as a working area used when the control programs are executed, and a nonvolatile storage area (auxiliary storage device) storing the control programs, content, and the like. The volatile storage area is, for example, a random-access memory (RAM). The nonvolatile storage area is, for example, a read-only memory (ROM), a flash memory, a hard disk drive (HDD), or the like. The control programs used by the computer 101 include a program for performing a calculation relating to a translation method, which will be described later.

The microphone 102 collects sounds therearound.

The input interface 103 is a touch panel arranged on a front surface of the display 107, for example, and receives an input from the user through a user interface (UI) displayed on the display 107. The input interface 103 may be, for example, an input device such as a numeric keypad or a keyboard.

The GPS module 104 receives a signal from a GPS satellite and estimates a position of the mobile terminal 100.

The acceleration sensor 105 detects the acceleration of the mobile terminal 100. More specifically, the acceleration sensor 105 detects the acceleration of the mobile terminal 100 along three axes perpendicular to one another based on a certain attitude of the mobile terminal 100.

The speaker 106 outputs a sound obtained by decoding speech information.

The display 107 is a display device that displays a result of processing performed by the computer 101. The display 107 is, for example, a liquid crystal display, an organic electroluminescent (EL) display, or the like.

The communication interface 108 communicates with the server 200 through the communication network 300. That is, the communication interface 108 may be any communication interface capable of accessing the communication network 300. More specifically, the communication interface 108 accesses the communication network 300 by accessing a base station of a mobile communication system or a router. The communication interface 108 may be, for example, a wireless local area network (LAN) interface according to an Institute of Electrical and Electronics Engineers (IEEE) 802.11a, b, g, or n standard, or may be a wireless communication interface according to a communication standard used in a mobile communication system such as a third generation (3G) mobile communication system, a fourth generation (4G) mobile communication system, and an LTE (registered trademark) mobile communication system.

Alternatively, the communication interface 108 may access the communication network 300 by accessing another mobile terminal. In this case, for example, the communication interface 108 may be a wireless LAN interface or a wireless communication interface according to a Bluetooth (registered trademark) standard.

1-1-2. Server

Next, the hardware configuration of the server 200 will be described with reference to FIG. 3.

Figure 3:
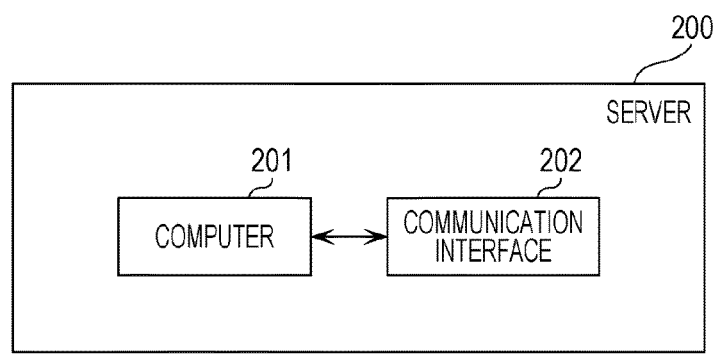
FIG. 3 is a block diagram illustrating an example of the hardware configuration of a server according to the first embodiment.

FIG. 3 is a block diagram illustrating an example of the hardware configuration of the server 200 according to the first embodiment.

As illustrated in FIG. 3, the server 200 includes a computer 201 and a communication interface 202. The server 200 may include a plurality of devices.

The computer 201 includes a processor that executes control programs for operating the server 200, a volatile storage area (main storage device) used as a working area used when the control programs are executed, and a nonvolatile storage area (auxiliary storage device) storing the control programs, content, and the like. The volatile storage area is, for example, a RAM. The nonvolatile storage area is, for example, a ROM, a flash memory, an HDD, or the like. The control programs used by the computer 201 include a program for performing a calculation relating to the translation method, which will be described later.

The communication interface 202 communicates with the mobile terminal 100 through the communication network 300. The communication interface 202 is, for example, a wired LAN interface. The communication interface 202 may be a wireless LAN interface. The communication interface 202 is not limited to a LAN interface and may be any communication interface capable of accessing the communication network 300.

1-1-3. Communication Network

Next, the configuration of the communication network 300 will be described with reference to FIG. 1.

The communication network 300 enables the mobile terminal 100 and the server 200 to communicate with each other. The communication network 300 may be a general-purpose network such as the Internet or may be a network specifically provided for the translation system 1.

1-2. Functional Configuration of Translation System

Next, the functional configuration of the translation system 1 will be described with reference to FIG. 4.

Figure 4:
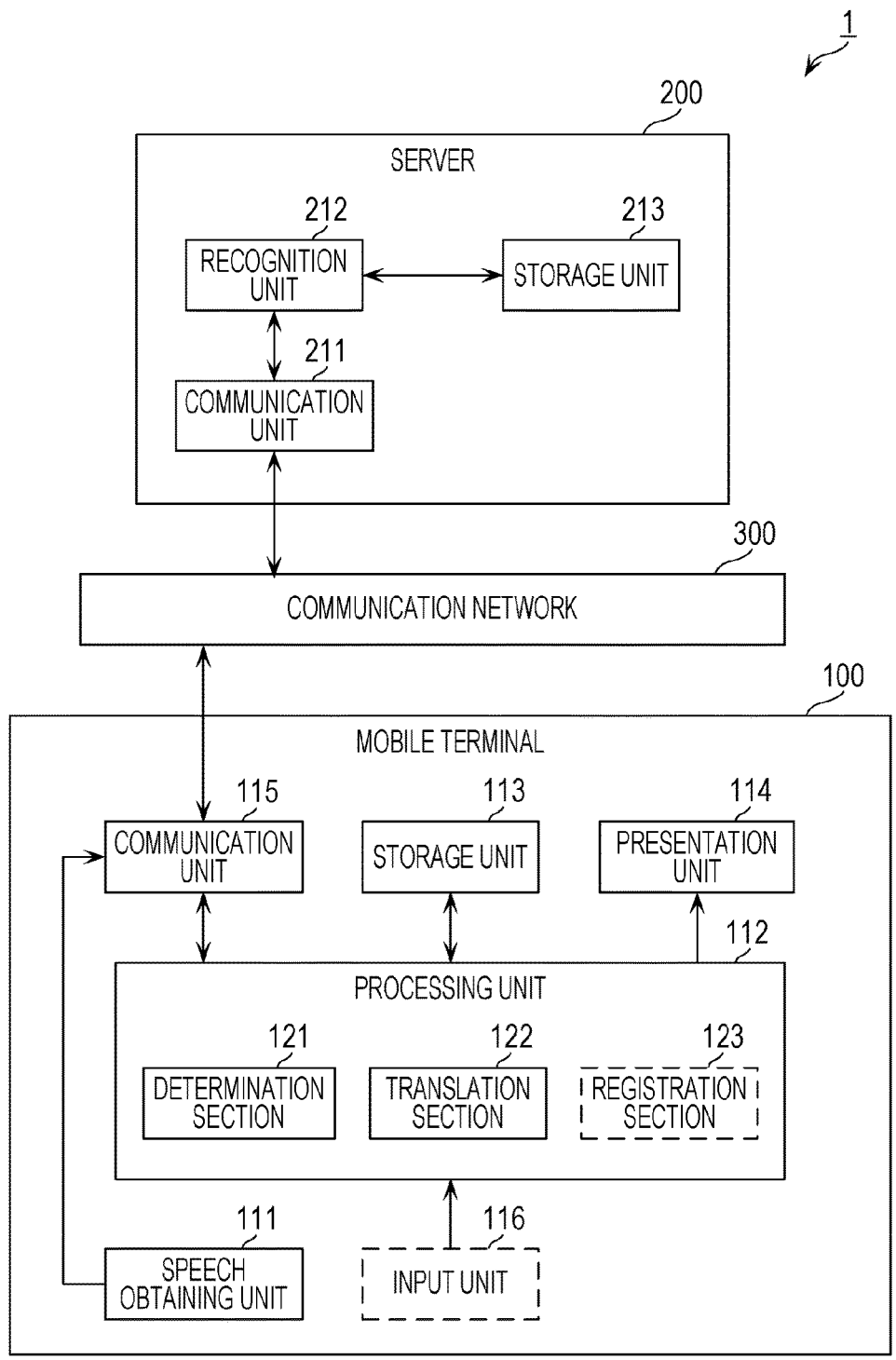
FIG. 4 is a block diagram illustrating an example of the functional configuration of the translation system according to the first embodiment.

FIG. 4 is a block diagram illustrating an example of the functional configuration of the translation system 1 according to the first embodiment.

First, the functional configuration of the mobile terminal 100 will be described.

The mobile terminal 100 includes a speech obtaining unit 111, a processing unit 112, a storage unit 113, a presentation unit 114, and a communication unit 115 as functional components. The mobile terminal 100 may further include an input unit 116.

The speech obtaining unit 111 obtains a speech sound uttered by the user. More specifically, the speech obtaining unit 111 obtains sound information including sounds collected by the microphone 102 as a sound signal and obtains speech information including a speech sound uttered by the user by dividing the obtained sound signal into a speech signal and other signals including noise. The speech obtaining unit 111 is achieved, for example, by the computer 101, the microphone 102, and the like.

The processing unit 112 performs various processes such as determination, translation, and registration. More specifically, the processing unit 112 includes a determination section 121 and a translation section 122. The processing unit 112 may further include a registration section 123.

The determination section 121 makes a first determination for determining whether a language recognized by the server 200 is a first language registered to the storage unit 113 in advance. Here, the language recognized by the server 200 is a result of recognition of a language of a speech sound uttered by the user, which is obtained by the speech obtaining unit 111, performed by the server 200.

If the determination section 121 determines as a result of the first determination that the language recognized by the server 200 is the first language, the translation section 122 translates the speech sound obtained by the speech obtaining unit 111 into a second language, which is different from the first language. In the present embodiment, for example, the second language is English. The second language may be registered to the storage unit 113 in advance and may be changed by the user. If the determination section 121 determines as a result of the first determination that the language recognized by the server 200 is not the first language, the translation section 122 does not translate the speech sound obtained by the speech obtaining unit 111.

The registration section 123 registers, to the storage unit 113 as the first language, a language input through the input unit 116. That is, the registration section 123 receives the first language, which serves for determinations made by the determination section 121, input through a registration process performed by the user. If the user inputs Japanese as the first language, for example, the mobile terminal 100 does not translate a non-Japanese speech sound obtained thereby. In the present embodiment, for example, the first language is Japanese.

The first language registered to the storage unit 113 in advance need not be registered by the registration section 123. For example, English may be registered as the first language in default settings, not as an input from the user.

The processing unit 112 is achieved, for example, by the computer 101.

The storage unit 113 stores information obtained as a result of processing performed by the processing unit 112. The storage unit 113 is achieved, for example, by the nonvolatile storage area of the computer 101.

The presentation unit 114 presents a result of processing performed by the processing unit 112. More specifically, the presentation unit 114 displays a result of translation on the display 107 as text. Alternatively, the presentation unit 114 may output a speech sound indicating a result of translation from the speaker 106. The presentation unit 114 may be achieved by the computer 101 and the display 107, for example, or may be achieved by the computer 101 and the speaker 106.

The communication unit 115 enables the mobile terminal 100 and the server 200 to access each other through the communication network 300 and communicates with the server 200. The communication unit 115 transmits speech information output from the speech obtaining unit 111 to the server 200. The communication unit 115 also receives information output from the server 200 and outputs the received information to the processing unit 112. The communication unit 115 is achieved, for example, the computer 101 and the communication interface 108.

The input unit 116 receives an input from the user. More specifically, the input unit 116 receives an input from the user who is using a certain application executed by the processing unit 112. The input unit 116 receives, for example, an input relating to registration performed by the user using a translation application or the like. The input unit 116 is achieved, for example, the computer 101 and the input interface 103.

Next, the functional configuration of the server 200 will be described.

The server 200 includes a communication unit 211, a recognition unit 212, and a storage unit 213 as functional components.

The communication unit 211 enables the server 200 and the mobile terminal 100 to access each other through the communication network 300 and communicates with the mobile terminal 100. The communication unit 211 receives speech information transmitted from the mobile terminal 100. The communication unit 211 also transmits, to the mobile terminal 100, a result of recognition performed by the recognition unit 212 on the received speech information. The communication unit 211 is achieved, for example, by the computer 201 and the communication interface 202.

The recognition unit 212 performs multilingual speech recognition on a speech sound included in received speech information. More specifically, the recognition unit 212 identifies text corresponding to a speech sound included in received speech information on the basis of a multilingual database stored in the storage unit 213 in which multilingual speech sounds and multilingual text are associated with each other. The multilingual database includes, for example, a table in which speech data regarding speech sounds in various languages, namely Japanese, English, Chinese, Spanish, French, and German, for example, and text data representing the speech sounds in text are associated with each other. That is, when the recognition unit 212 identifies text, the recognition unit 212 also identifies a language of a speech sound included in speech information. The recognition unit 212 outputs, as a result of the multilingual speech recognition, text data corresponding to a speech sound included in speech information and language information indicating a language of the text data. The recognition unit 212 is achieved, for example, by the computer 201.

The storage unit 213 is achieved, for example, by the nonvolatile storage area of the computer 201.

1-3. Operation

Next, the operation of the translation system 1 will be described with reference to FIGS. 5 and 6.

Figure 5:
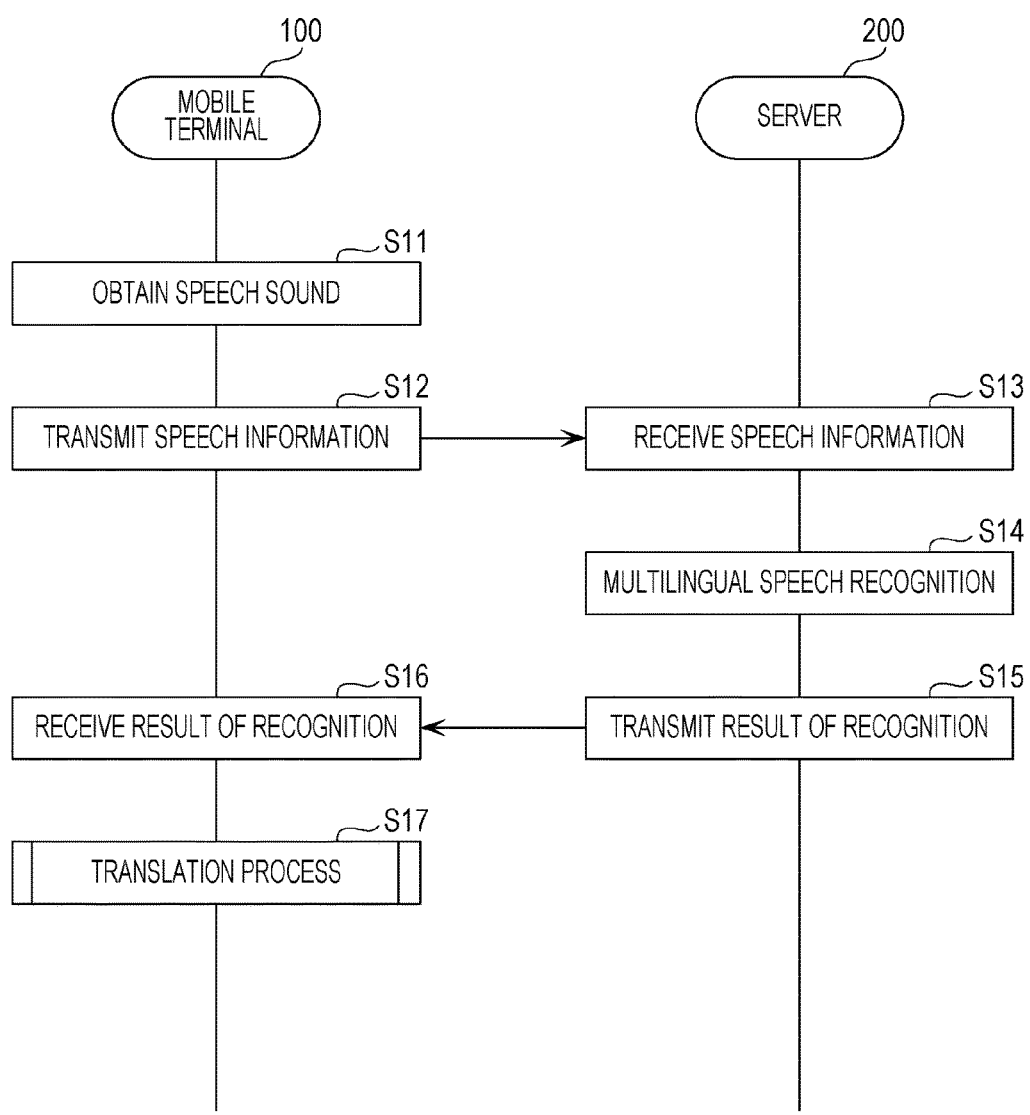
FIG. 5 is a sequence diagram illustrating an example of a method for recognizing a speech sound used by the translation system according to the first embodiment.

FIG. 5 is a sequence diagram illustrating an example of a method for recognizing a speech sound used by the translation system 1 according to the first embodiment.

First, the user operates the mobile terminal 100 to cause the mobile terminal 100 to execute a translation application.

As a result, the mobile terminal 100 starts a process for recognizing a speech sound relating to the method for recognizing a speech sound.

The speech obtaining unit 111 of the mobile terminal 100 obtains a speech sound (S11).

The communication unit 115 of the mobile terminal 100 transmits speech information indicating the speech sound obtained by the speech obtaining unit 111 to the server 200 through the communication network 300 (S12).

Next, the server 200 receives the speech information through the communication network 300 (S13).

The server 200 performs multilingual speech recognition on the received speech information (S14) and transmits a result of the multilingual speech recognition to the mobile terminal 100 through the communication network 300 (S15).

Next, the mobile terminal 100 receives the result of the multilingual speech recognition from the server 200 through the communication network 300 (S16).

The mobile terminal 100 then performs a translation process in accordance with the result of the multilingual speech recognition (S17).

Details of the translation process will be described with reference to FIG. 6.

Figure 6:
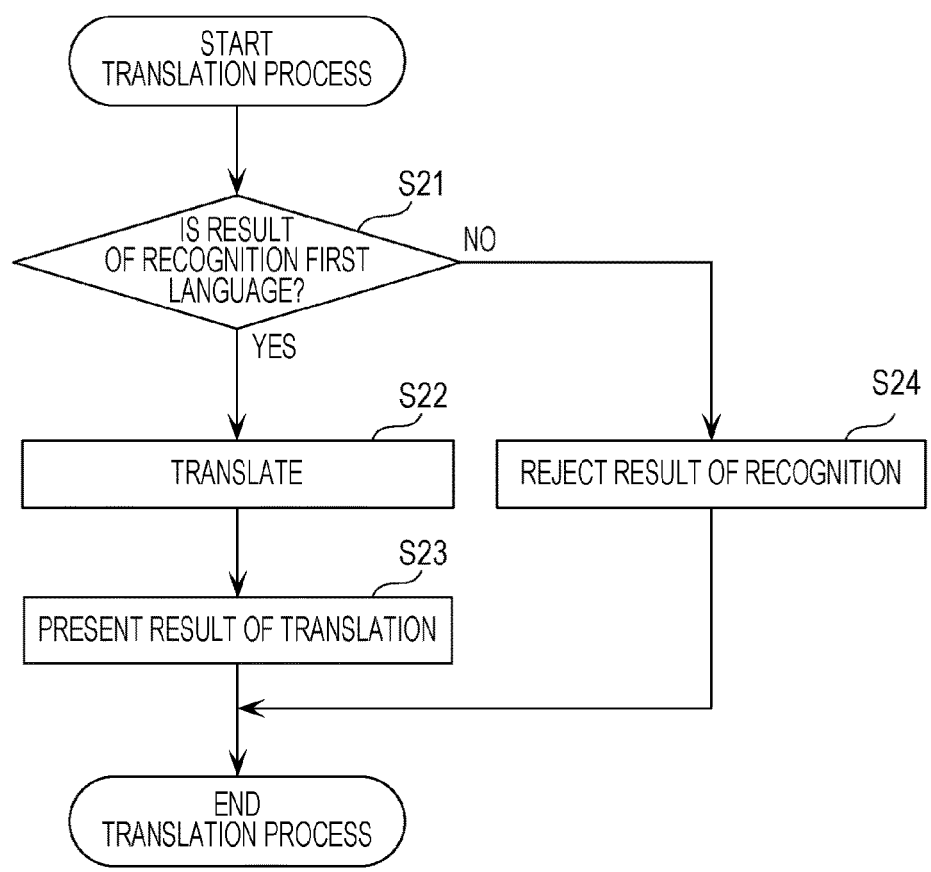
FIG. 6 is a flowchart illustrating an example of a translation process performed by the mobile terminal according to the first embodiment.

FIG. 6 is a flowchart illustrating an example of the translation process performed by the mobile terminal 100 according to the first embodiment.

First, the determination section 121 of the mobile terminal 100 determines whether a received result of recognition is the first language registered to the storage unit 113 in advance (S21). If the first language is Japanese, for example, the determination section 121 determines whether the received result of recognition is Japanese.

If the determination section 121 determines that the received result of recognition is the first language registered to the storage unit 113 in advance (YES in S21), the translation section 122 of the mobile terminal 100 translates text data included in the result of recognition into the second language, which is different from the first language (S22). If the second language is English, for example, the translation section 122 translates the Japanese text data into English.

The presentation unit 114 of the mobile terminal 100 presents a result of the translation performed by the translation section 122 (S23). More specifically, the presentation unit 114 may display the result of the translation of the text data into English on the display 107 or may output the result of the translation from the speaker 106 as a speech sound.

If the determination section 121 determines that the received result of recognition is not the first language registered to the storage unit 113 in advance (NO in S21), the translation section 122 of the mobile terminal 100 rejects the result of recognition without translating translate text data (S24). More specifically, if the received result of recognition is English, the translation section 122 does not translate English text data.

1-4. Advantageous Effects

With the method for recognizing a speech sound according to the present embodiment, if a result of recognition is not the first language, the result is not translated into the second language. In this case, for example, speech sounds uttered by persons other than the user are basically not recognized even in a crowded place. In particular, when the user needs translation, people around the user are usually not speaking in the user's mother tongue. In this case, if the user's mother tongue is set as the first language, for example, only the first language is translated. Erroneous detection, therefore, can be reduced even in a situation in which speech sounds uttered by persons other than the user can be erroneously detected, such as in a crowded place.

In addition, with the method for recognizing a speech sound according to the present embodiment, the user registers the first language, and the registered first language is used for the first determination. The user can easily set the first language.

Second Embodiment

Next, a second embodiment will be described with reference to FIGS. 7 and 8.

2-1. Configuration

Figure 7:
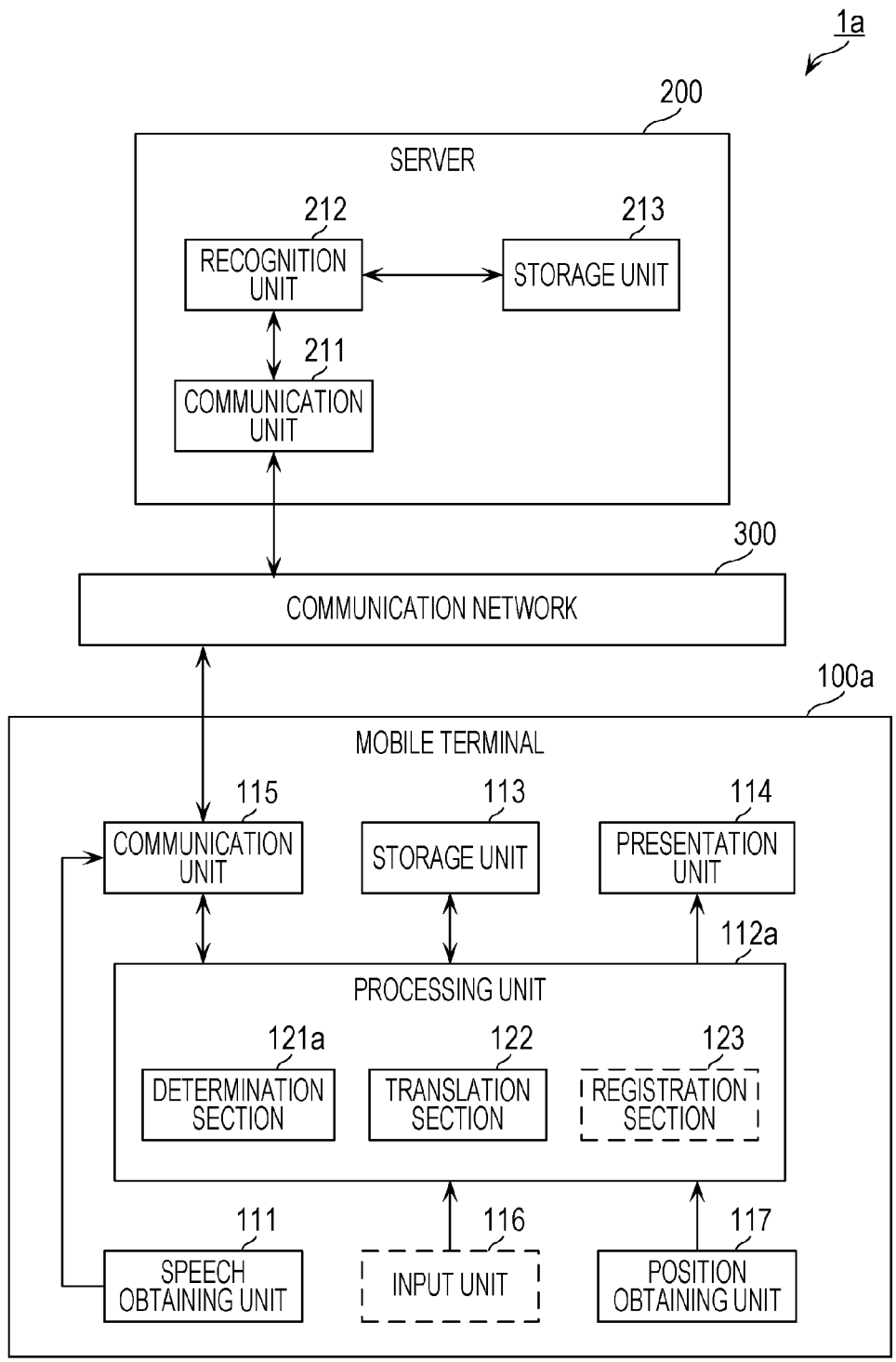
FIG. 7 is a block diagram illustrating an example of the functional configuration of a translation system according to a second embodiment.

FIG. 7 is a block diagram illustrating an example of the functional configuration of a translation system 1a according to the second embodiment.

As illustrated in FIG. 7, the translation system 1a according to the second embodiment is different from the translation system 1 according to the first embodiment in terms of the configuration of a mobile terminal 100a. More specifically, unlike the mobile terminal 100, the mobile terminal 100a further includes a position obtaining unit 117. In addition, the mobile terminal 100a is different from the mobile terminal 100 according to the first embodiment in terms of functions of a determination section 121a of a processing unit 112a.

Other components are the same as those according to the first embodiment. In the present embodiment, therefore, only the components different from those according to the first embodiment will be described, and description of the same components as those according to the first embodiment is omitted. In the present embodiment, the same components as those according to the first embodiment are given the same reference numerals as in the first embodiment.

The hardware configuration of the mobile terminal 100a is the same as that of the mobile terminal 100.

The position obtaining unit 117 obtains positional information indicating a position of the mobile terminal 100a. That is, the position obtaining unit 117 detects the position of the mobile terminal 100a. The position obtaining unit 117 is achieved, for example, by the computer 101 and the GPS module 104.

If a language recognized by the server 200 is an official language of an area including a position indicated by positional information obtained by the position obtaining unit 117, the determination section 121 determines as a result of the first determination that the language recognized by the server 200 is not the first language.

2-2. Operation

The operation of the translation system 1a according to the second embodiment is different from that of the translation system 1 according to the first embodiment in terms of a translation process performed by the mobile terminal 100a. The translation process performed by the mobile terminal 100a will be described.

Figure 8:
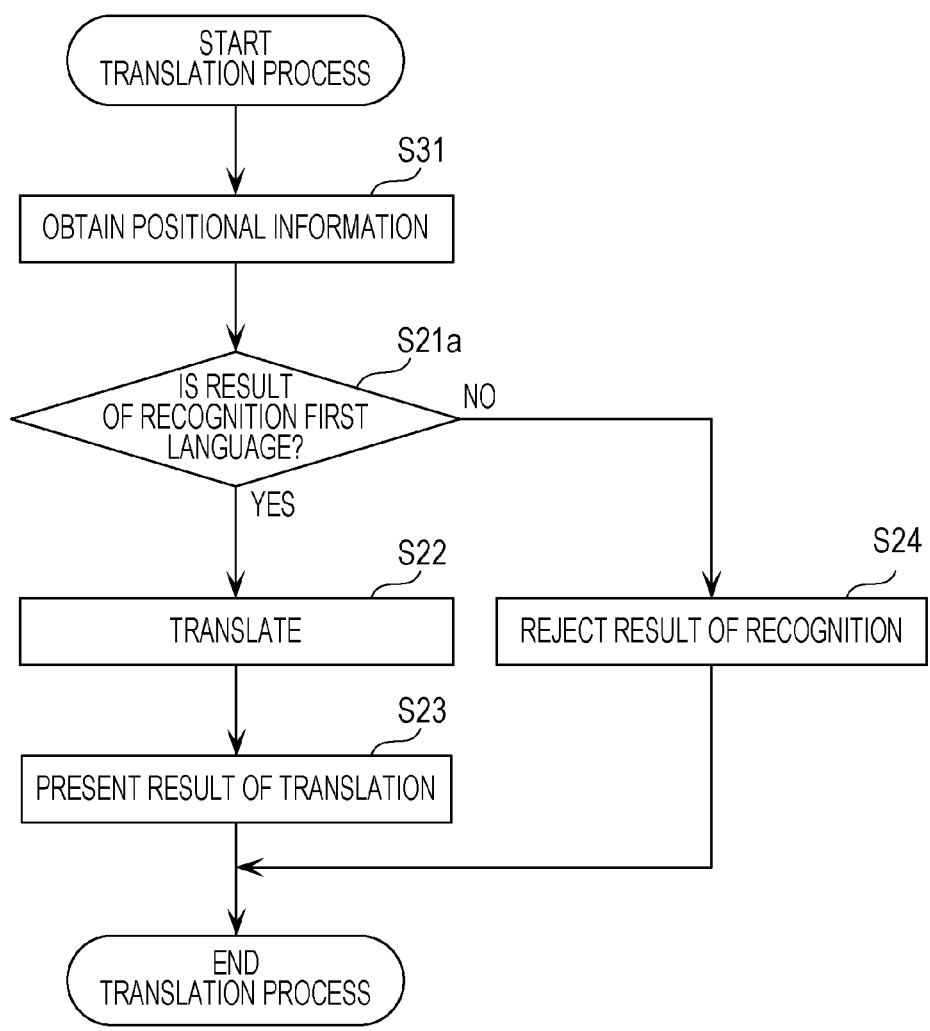
FIG. 8 is a flowchart illustrating an example of a translation process performed by a mobile terminal according to the second embodiment.

FIG. 8 is a flowchart illustrating an example of the translation process performed by the mobile terminal 100a according to the second embodiment.

In the translation process according to the second embodiment, steps S22 to S24 are the same as in the translation process according to the first embodiment, and description thereof is omitted.

First, the position obtaining unit 117 of the mobile terminal 100a obtains positional information indicating the position of the mobile terminal 100a (S31).

Next, the determination section 121a of the mobile terminal 100a determines whether a received result of recognition is the first language registered to the storage unit 113 in advance (S21a). At this time, if the received result of recognition is an official language of an area including the position indicated by the positional information obtained by the position obtaining unit 117, the determination section 121a determines that the received result of recognition is not the first language. More specifically, if the mobile terminal 100a is in the United States and the result of recognition is English, which is an official language of the United States, the determination section 121a determines that the result of recognition is not the first language. The translation section 122 therefore rejects the result of recognition in step S24 without translating text data.

2-3. Advantageous Effects

With a method for recognizing a speech sound according to the present embodiment, the position of the mobile terminal 100a is detected, and, if a language of a result of recognition is an official language of an area including the detected position, it is determined in the first determination that the language of the result of recognition is not the first language.

That is, since it is determined that an official language at a current position is not the first language, the official language of an area including the current position is not translated. As a result, speech sounds uttered by the user when translation is necessary can be translated.

That is, when the user stays in an area in which the user's mother tongue is an official language, the user need not translate speech sounds uttered thereby. When the user stays in an area in which the user's mother tongue is not an official language, on the other hand, the translation system 1 does not translate speech sounds in the official language of the area, and speech sounds uttered by persons other than the user are basically not recognized.

2-4. Modification

If the mobile terminal 100a obtains positional information as in the second embodiment, the second language may be dynamically set in accordance with the positional information.

In this case, the determination section 121a may make a second determination for determining whether a position obtained by the position obtaining unit 117 is included in a second area, which is different from a first area in which the first language is an official language.

If the determination section 121a determines as a result of the second determination that the position obtained by the position obtaining unit 117 is included in the second area, the translation section 122 may set an official language of the second area as the second language. In this case, the user can easily translate speech sounds uttered thereby into an official language of an area in which the user stays without setting the second language.

Third Embodiment

Next, a third embodiment will be described with reference to FIGS. 9 and 10.

3-1. Configuration

Figure 9:
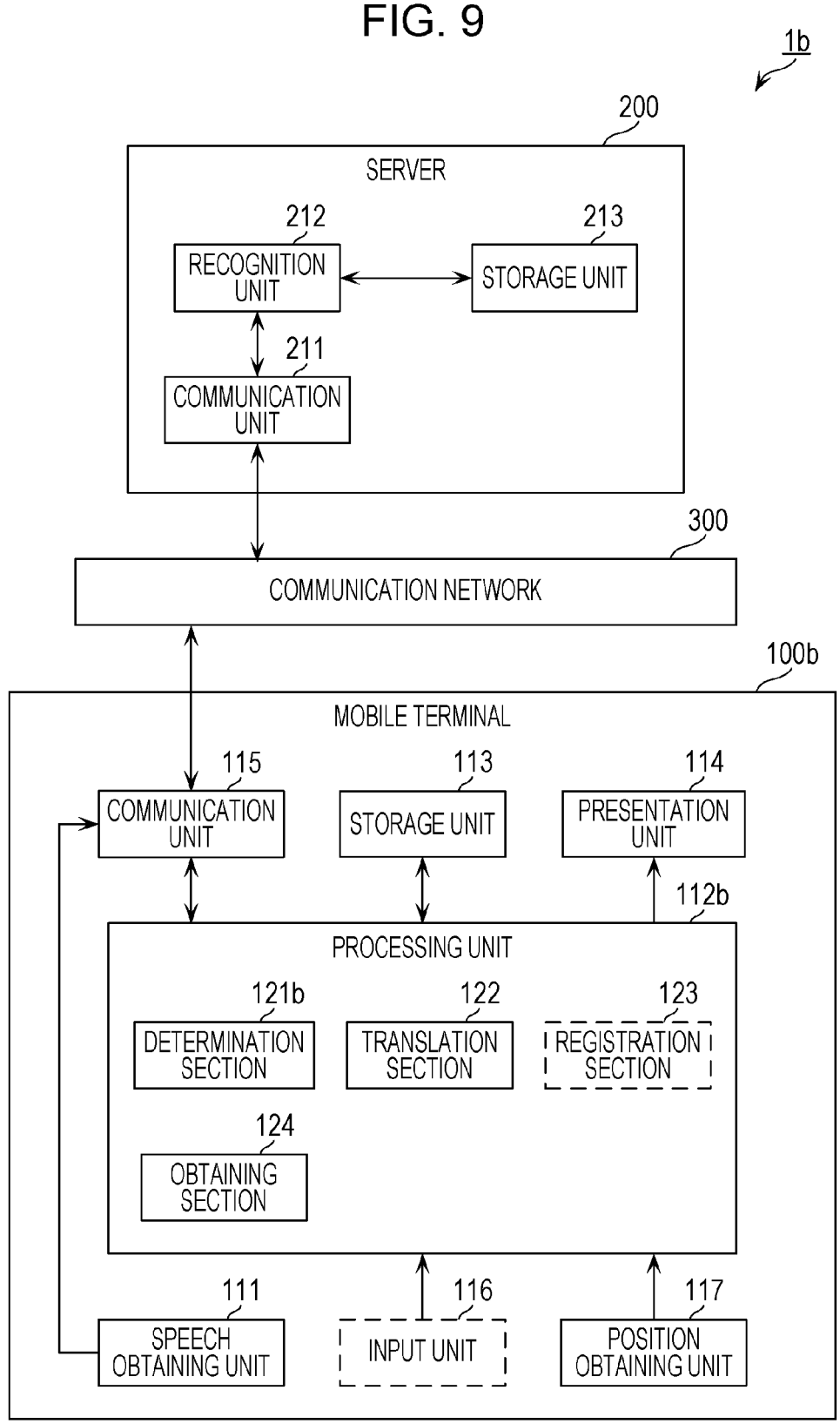
FIG. 9 is a block diagram illustrating an example of the functional configuration of a translation system according to a third embodiment.

FIG. 9 is a block diagram illustrating an example of the functional configuration of a translation system 1b according to the third embodiment.

As illustrated in FIG. 9, the translation system 1b according to the third embodiment is different from the translation system 1a according to the second embodiment in terms of the configuration of a mobile terminal 100b. More specifically, unlike the processing unit 112a of the mobile terminal 100a, a processing unit 112b of the mobile terminal 100b further includes an obtaining section 124. In addition, the mobile terminal 100b is different from the mobile terminal 100a according to the second embodiment in terms of functions of a determination section 121b. Other components are the same as those according to the second embodiment. In the present embodiment, therefore, only the components different from those according to the second embodiment will be described, and description of the same components as those according to the second embodiment is omitted. In the present embodiment, the same components as those according to the second embodiment are given the same reference numerals as in the second embodiment.

The hardware configuration of the mobile terminal 100b is the same as that of the mobile terminal 100.

The obtaining section 124 obtains notification information output from a certain application.

The determination section 121b makes a third determination for determining on the basis of a position detected by the position obtaining unit 117 and notification information obtained by the obtaining section 124 whether translation is necessary at a current position of the mobile terminal 100b in a current state of the user. More specifically, a place where translation is necessary is a place where the user needs to communicate with other people in an area in which the user's mother tongue is not an official language, namely, for example, an airport, a hotel, a restaurant, a store, or a station. A state in which translation is necessary is, for example, a state after the user checks in at an airport, a state after the user checks in at a hotel, a state after a coupon is checked at a restaurant or a store, a state after the user goes through a gate at a station, or the like.

Whether the user is in a place where translation is necessary can be determined on the basis of positional information obtained by the position obtaining unit 117. Whether the user is in a state in which translation is necessary can be determined on the basis of notification information because the obtaining section 124 of the mobile terminal 100b obtains the notification information when the user checks in at an airport, checks in at a hotel, uses a coupon at a restaurant or a store, or goes through a gate at a station using the certain application of the mobile terminal 100b.

The determination section 121b determines that translation is necessary at the current position of the mobile terminal 100b in the current state of the user, for example, (1) if the position of the mobile terminal 100b indicated by the positional information obtained by the position obtaining unit 117 is an airport and the notification information obtained by the obtaining section 124 indicates that the user has checked in at the airport, (2) if the position of the mobile terminal 100b indicated by the positional information obtained by the position obtaining unit 117 is a hotel and the notification information obtained by the obtaining section 124 indicates that the user has checked in at the hotel, (3) if the position of the mobile terminal 100b indicated by the positional information obtained by the position obtaining unit 117 is a restaurant or a store and the notification information obtained by the obtaining section 124 indicates that the user has used a coupon, or (4) if the position of the mobile terminal 100b indicated by the positional information obtained by the position obtaining unit 117 is a station and the notification information obtained by the obtaining section 124 indicates that the user has gone through a gate at the station.

If determining as a result of the third determination that translation is necessary at the current position of the mobile terminal 100b in the current state of the user, the determination section 121b makes the first determination. If determining as a result of the third determination that translation is not necessary at the current position of the mobile terminal 100b in the current state of the user, the determination section 121b does not make the first determination.

3-2. Operation

The operation of the translation system 1b according to the third embodiment is different from that of the translation system 1 according to the second embodiment in terms of a translation process performed by the mobile terminal 100b. The translation process performed by the mobile terminal 100b will be described.

Figure 10:
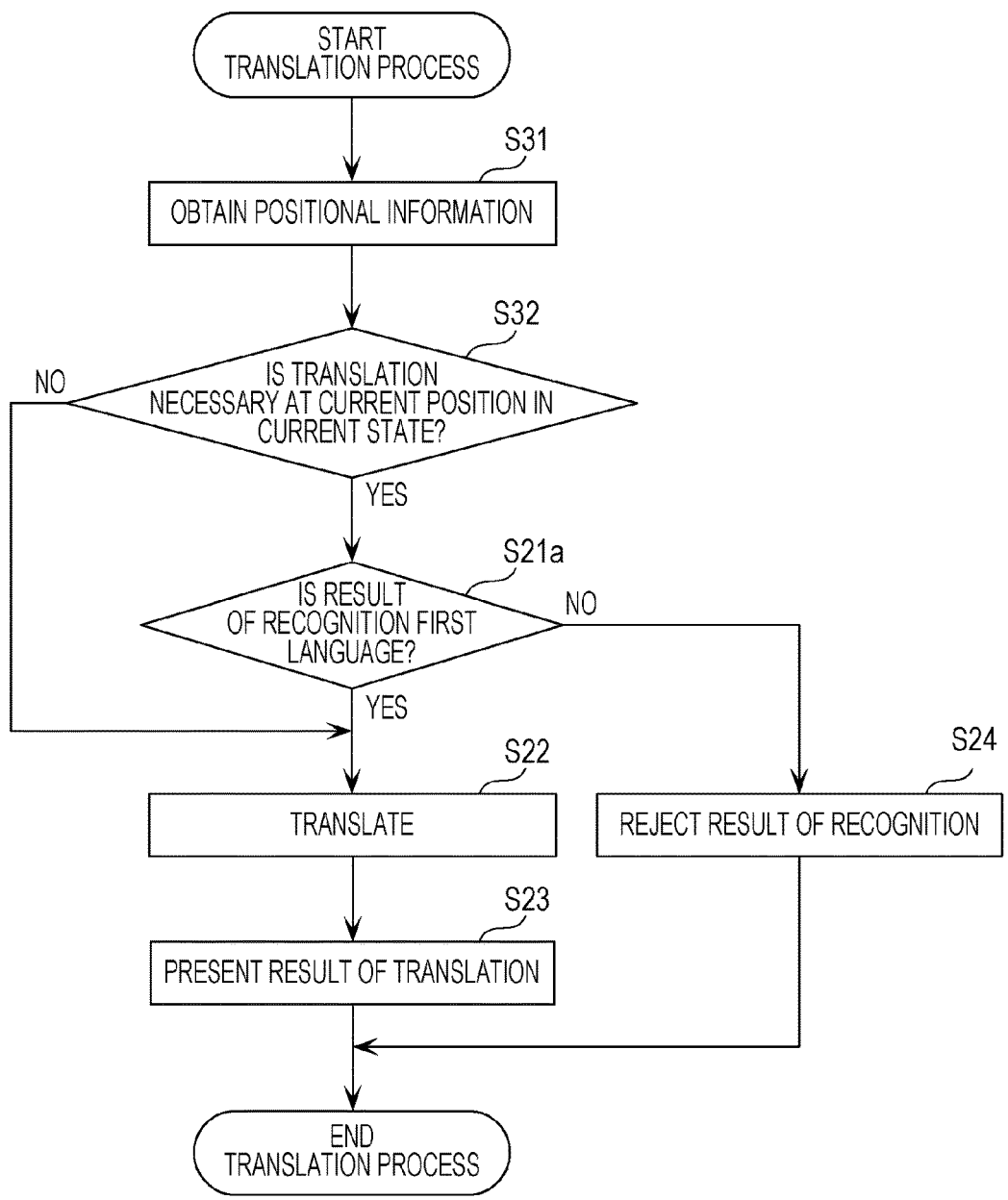
FIG. 10 is a flowchart illustrating an example of a translation process performed by a mobile terminal according to the third embodiment.

FIG. 10 is a flowchart illustrating an example of the translation process performed by the mobile terminal 100b according to the third embodiment.

In the translation process according to the third embodiment, steps S31 and S21a to S24 are the same as in the translation process according to the second embodiment, description thereof is omitted.

First, step S31 is performed, and then the determination section 121b of the mobile terminal 100b makes the third determination for determining whether translation is necessary at the current position of the mobile terminal 100b in the current state of the user (S32).

If determining that translation is necessary at the current position of the mobile terminal 100b in the current state of the user (YES in S32), the determination section 121b makes the first determination (S21a).

If the determination section 121b determines that translation is not necessary at the current position of the mobile terminal 100b and/or in the current position of the user (NO in S32), on the other hand, the translation section 122 translates text data included in a result of multilingual speech recognition performed by the server 200 (S22), and the presentation unit 114 presents a result of the translation (S23).

3-3. Advantageous Effects

With a method for recognizing a speech sound according to the present embodiment, the position of the mobile terminal 100b is detected, notification information output from the certain application is obtained, the third determination for determining whether translation is necessary at the current position of the mobile terminal 100b in the current state of the user is made on the basis of the detected position and the obtained notification information, and if it is determined as a result of the third determination that translation is necessary at the current position of the mobile terminal 100b in the current state of the user, the first determination and the translation process are performed. If translation is not necessary at the current position of the mobile terminal 100b in the current state of the user, the first determination and the translation process are not performed. As a result, erroneous detection can be reduced in a situation in which speech sounds uttered by persons other than the user can be erroneously detected. The amount of processing, therefore, can be reduced.

Fourth Embodiment

Next, a fourth embodiment will be described with reference to FIGS. 11 and 12.

4-1. Configuration

Figure 11:
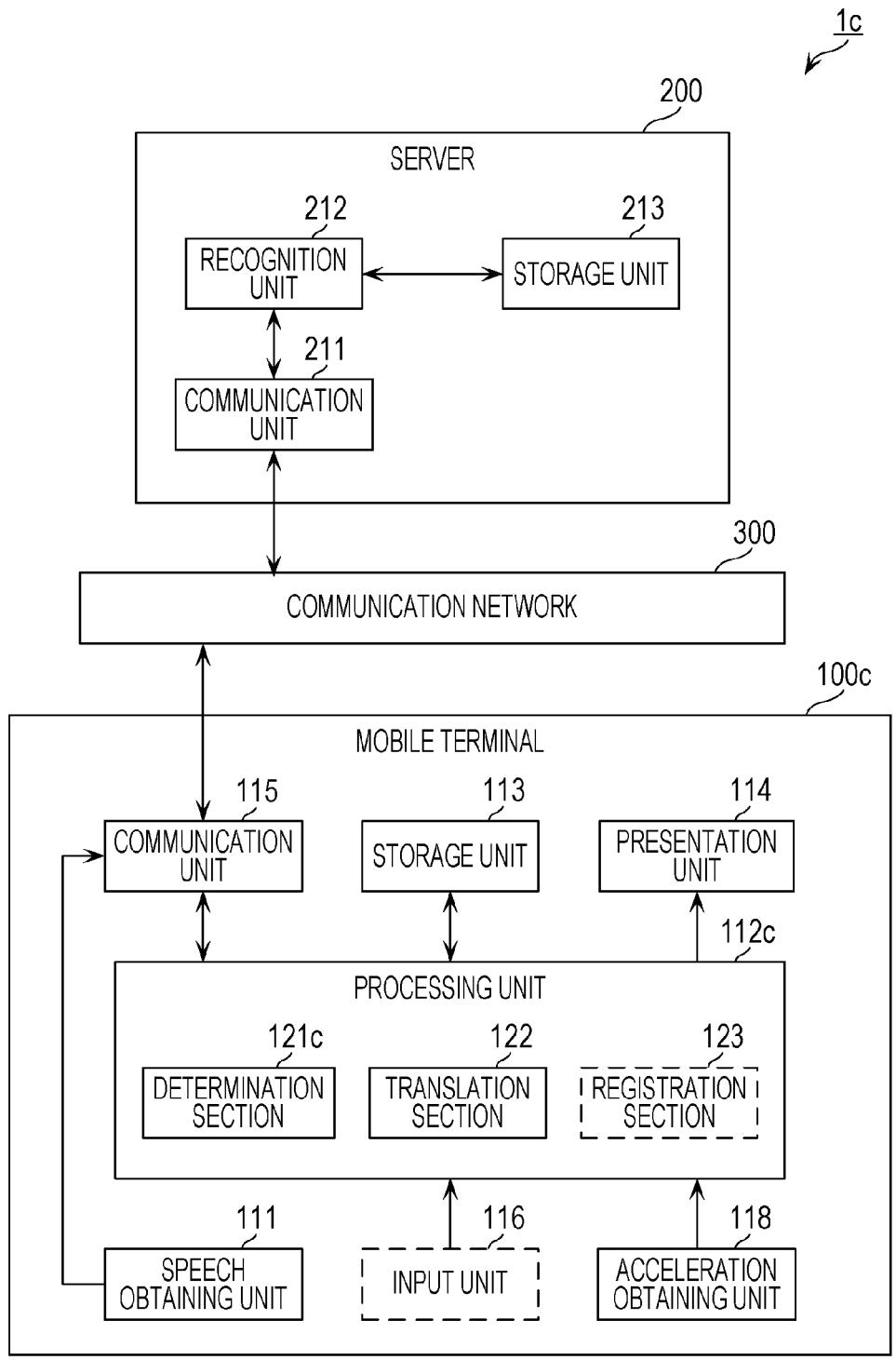
FIG. 11 is a block diagram illustrating an example of the functional configuration of a translation system according to a fourth embodiment.

FIG. 11 is a block diagram illustrating an example of the functional configuration of a translation system 1c according to the fourth embodiment.

As illustrated in FIG. 11, the translation system 1c according to the fourth embodiment is different from the translation system 1 according to the first embodiment in terms of the configuration of a mobile terminal 100c. More specifically, unlike the mobile terminal 100, the mobile terminal 100c further includes an acceleration obtaining unit 118. In addition, the mobile terminal 100c is different from the mobile terminal 100 according to the first embodiment in terms of functions of a determination section 121c of a processing unit 112c. Other components are the same as those according to the first embodiment. In the present embodiment, therefore, only the components different from those according to the first embodiment will be described, and description of the same components as those according to the first embodiment is omitted. In the present embodiment, the same components as those according to the first embodiment are given the same reference numerals.

The hardware configuration of the mobile terminal 100c is the same as that of the mobile terminal 100.

The acceleration obtaining unit 118 detects the acceleration of the mobile terminal 100c. The acceleration obtaining unit 118 is achieved, for example, by the computer 101 and the acceleration sensor 105.

The determination section 121c calculates, on the basis of the acceleration obtained by the acceleration obtaining unit 118, a speed at which the user carrying the mobile terminal 100c is moving. The determination section 121c then makes a fourth determination for determining whether the user is moving at a certain speed or higher by determining whether the calculated speed is equal to or higher than a certain value (e.g., walking speed (4 km/h)). If determining as a result of the fourth determination that the user is moving at the certain speed or higher, the determination section 121c does not make the first determination. If the user is not moving at the certain speed or higher, that is, if the calculated speed is lower than the certain value, the determination section 121c makes the first determination.

4-2. Operation

The operation of the translation system 1c according to the fourth embodiment is different from that of the translation system 1 according to the first embodiment in terms of a translation process performed by the mobile terminal 100c. The translation process performed by the mobile terminal 100c will be described.

Figure 12:
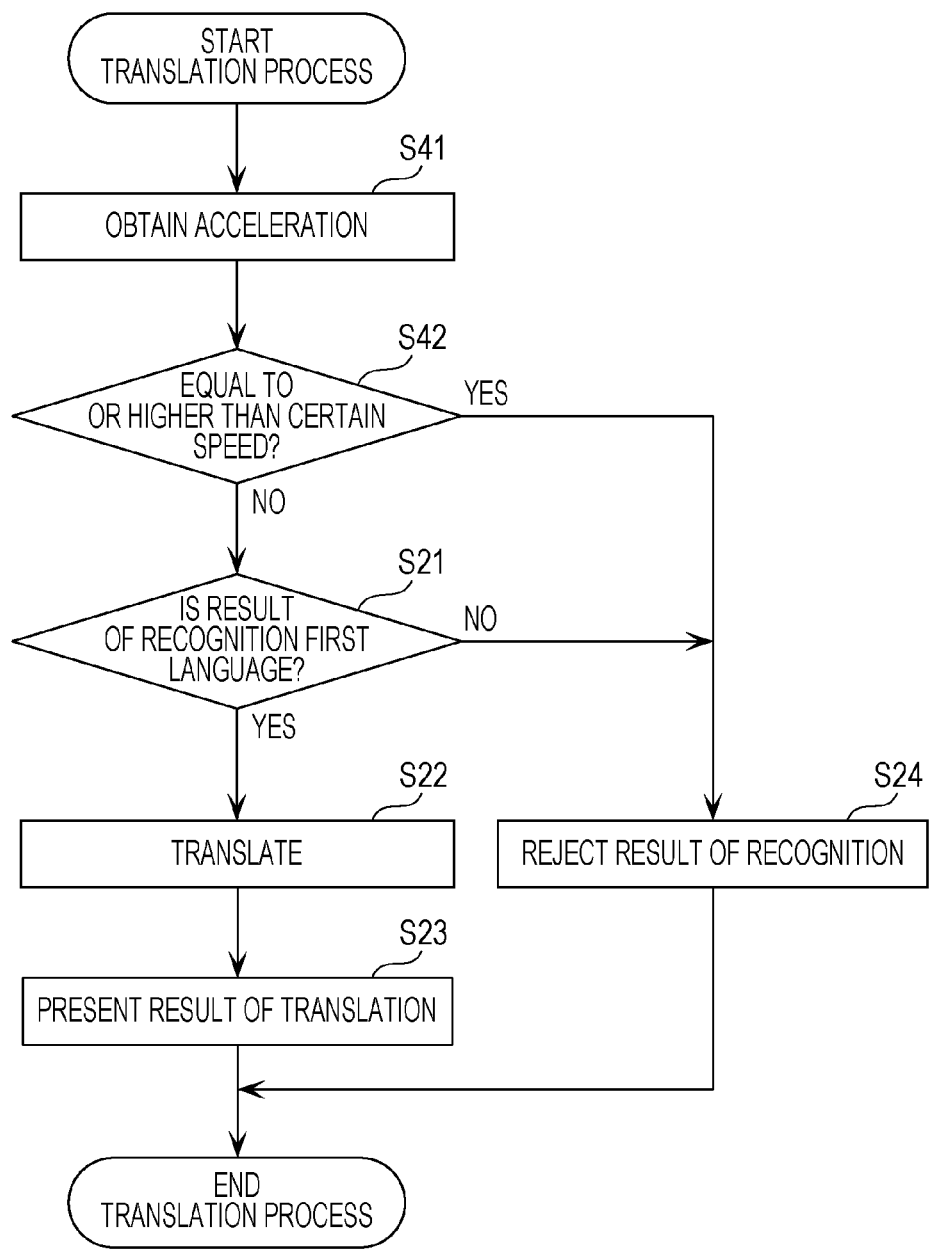
FIG. 12 is a flowchart illustrating an example of a translation process performed by a mobile terminal according to the fourth embodiment.

FIG. 12 is a flowchart illustrating an example of the translation process performed by the mobile terminal 100c according to the fourth embodiment.

In the translation process according to the fourth embodiment, steps S21 to S24 are the same as in the translation process according to the first embodiment, and description thereof is omitted.

First, the acceleration obtaining unit 118 of the mobile terminal 100c obtains the acceleration of the mobile terminal 100c (S41).

The determination section 121c of the mobile terminal 100c calculates, on the basis of the acceleration obtained by the acceleration obtaining unit 118, a speed at which the user is moving and makes the fourth determination for determining whether the user of the mobile terminal 100c is moving at the certain speed or higher (S42).

If determining that the user is not moving at the certain speed of higher, that is, if the speed at which the user is moving is lower than the certain value (NO in S42), the processing unit 112c of the mobile terminal 100c performs step S21. If determining that the user is moving at the certain speed or higher, that is, if the speed at which the user is moving is equal to or higher than the certain value (YES in S42), the processing unit 112c of the mobile terminal 100c performs step S42.

4-3. Advantageous Effects

With a method for recognizing a speech sound according to the present embodiment, the acceleration of the mobile terminal 100c is detected, the fourth determination for determining whether the user of the mobile terminal 100c is moving at the certain speed or higher is made using the detected acceleration, and, if it is determined as a result of the fourth determination that the user is moving at the certain speed or higher, the first determination and the translation process are not performed. If the user is not moving at the certain speed or higher, the first determination and the translation process are performed. When the user is moving at the certain speed or higher, noise such as wind noise, frictional noise, and vibration noise is likely to be detected. If the first determination and the translation process are not performed in this case, erroneous translation can be reduced.

Fifth Embodiment

Next, a fifth embodiment will be described with reference to FIGS. 13 and 14.

5-1. Configuration

Figure 13:
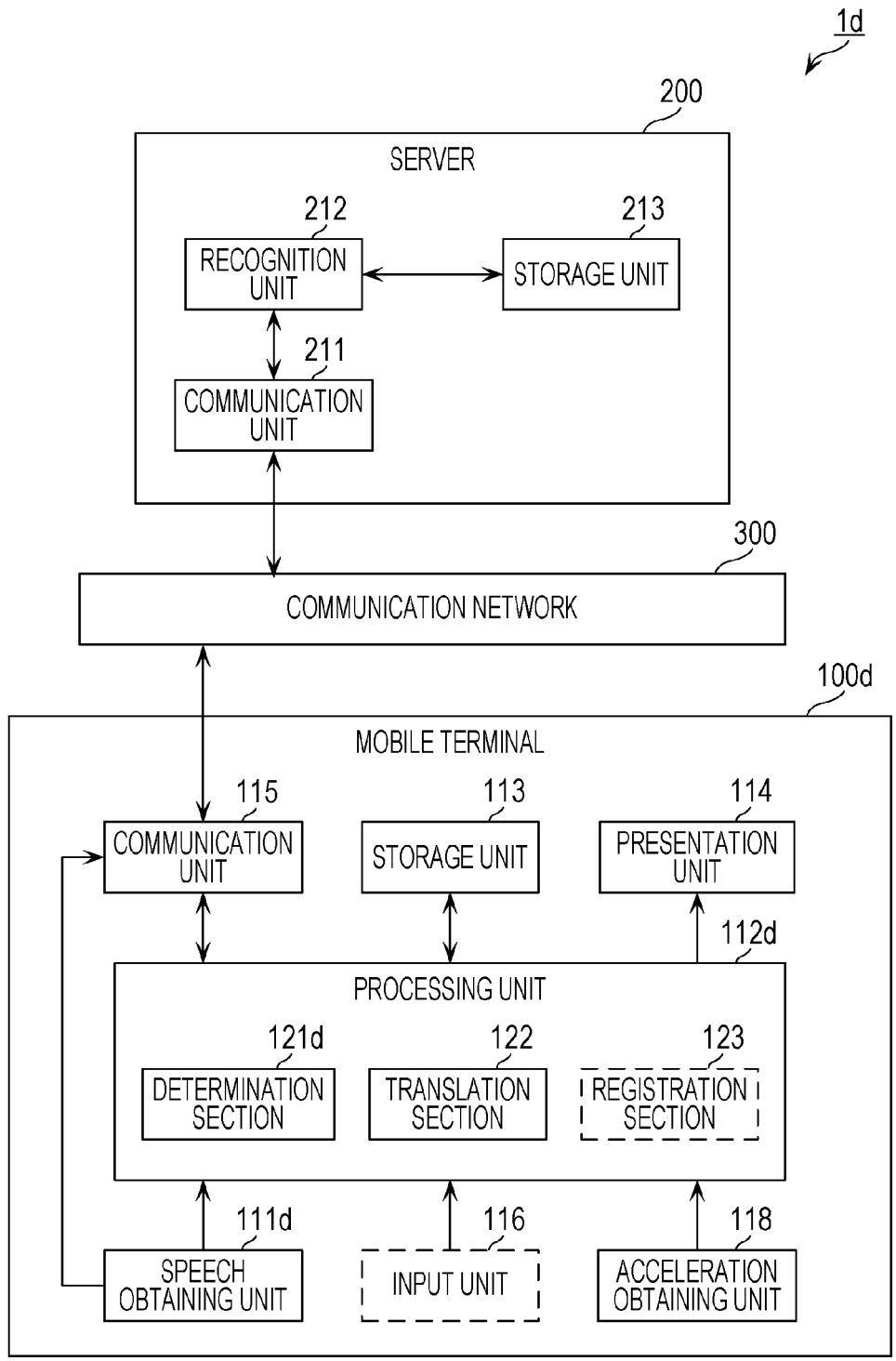
FIG. 13 is a block diagram illustrating an example of the functional configuration of a translation system according to a fifth embodiment.

FIG. 13 is a block diagram illustrating an example of the functional configuration of a translation system 1d according to the fifth embodiment.

As illustrated in FIG. 13, the translation system 1d according to the fifth embodiment is different from the translation system 1c according to the fourth embodiment in terms of the configuration of a mobile terminal 100d. More specifically, the mobile terminal 100d is different from the mobile terminal 100c according to the fourth embodiment in terms of functions of a speech obtaining unit 111d and a determination section 121d of a processing unit 112d. Other components are the same as those according to the fourth embodiment. In the present embodiment, therefore, only the components different from those according to the fourth embodiment will be described, and description of the same components as those according to the fourth embodiment is omitted. In the present embodiment, the same components as those according to the fourth embodiment are given the same reference numerals.

The hardware configuration of the mobile terminal 100d is the same as that of the mobile terminal 100.

The speech obtaining unit 111d measures a noise level around the mobile terminal 100d. More specifically, the speech obtaining unit 111d may measure a level of other signals obtained after a sound signal is divided into a speech signal and the other signals as the noise level around the mobile terminal 100d. The speech obtaining unit 111d is achieved, for example, by the computer 101 and the microphone 102.

The determination section 121d makes a fifth determination for determining whether a noise level measured by the speech obtaining unit 111d is higher than a certain noise level. More specifically, the determination section 121d compares the measured noise level and a level of a speech signal to determine whether a signal-to-noise ratio (S/N) is higher than a certain value (e.g., 0 db). If the S/N is higher than the certain value, the determination section 121d determines that the noise level is higher than the certain noise level. If the S/N is equal to or lower than the certain value, the determination section 121d determines that the noise level is equal to or lower than the certain noise level. If determining as a result of the fifth determination that the noise level is higher than the certain noise level, the determination section 121d does not make the first determination.

If the noise level is equal to or lower than the certain noise level, the determination section 121d makes the first determination.

5-2. Operation

The operation of the translation system 1d according to the fifth embodiment is different from that of the translation system 1c according to the fourth embodiment in terms of a translation process performed by the mobile terminal 100d. The translation process performed by the mobile terminal 100d will be described.

Figure 14:
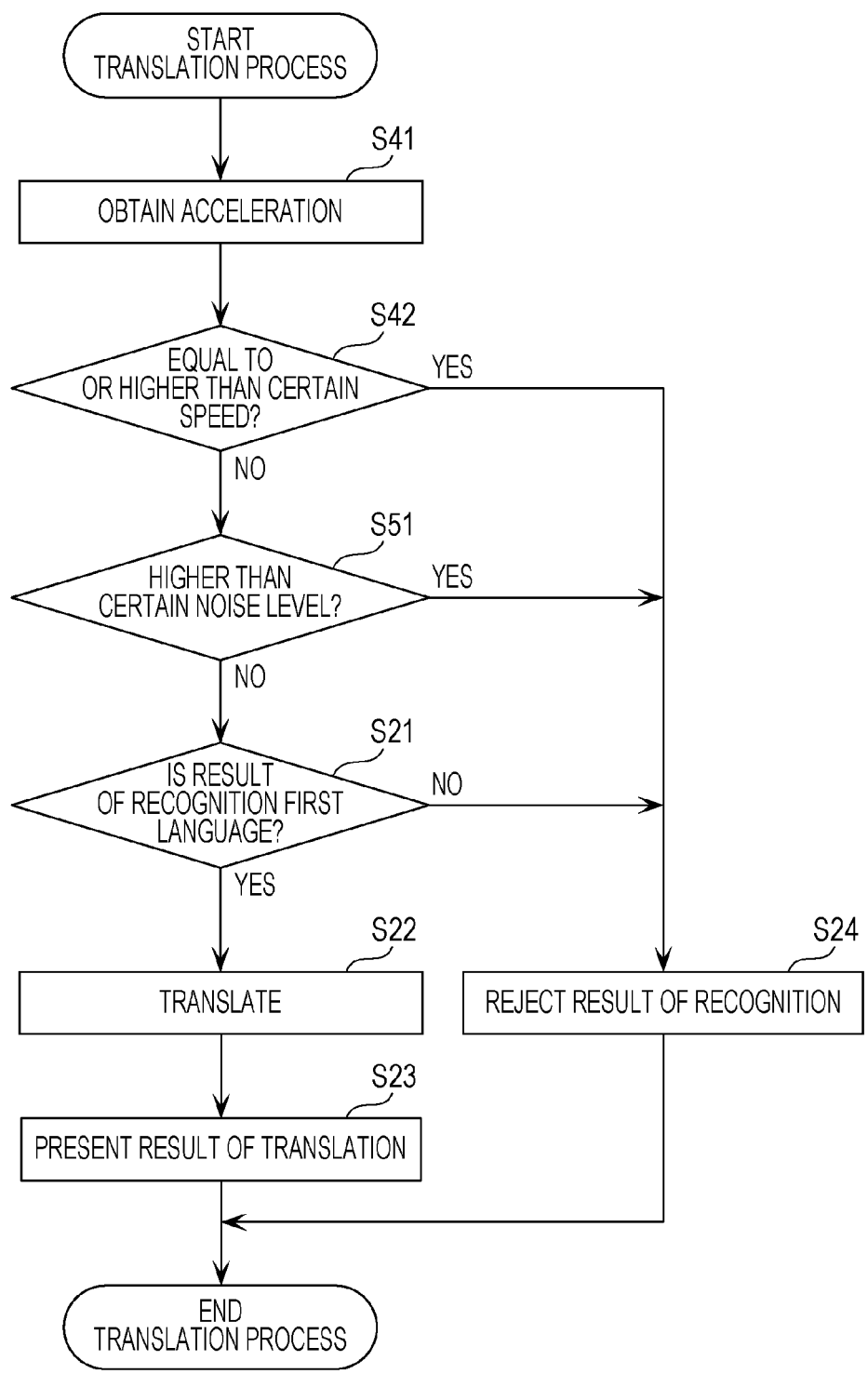
FIG. 14 is a flowchart illustrating an example of a translation process performed by a mobile terminal according to the fifth embodiment.

FIG. 14 is a flowchart illustrating an example of the translation process performed by the mobile terminal 100d according to the fifth embodiment.

In the translation process according to the fifth embodiment, steps S41, S42, and S21 to S24 are the same as in the translation process according to the fourth embodiment, and description thereof is omitted.

If determining that a result of step S42 is NO, the determination section 121d makes the fifth determination for determining whether a noise level measured by the speech obtaining unit 111d is higher than the certain noise level (S51).

If determining that the noise level measured by the speech obtaining unit 111d is equal to or lower than the certain noise level (NO in S51), the processing unit 112d of the mobile terminal 100d performs step S21.

If determining that a result of step S42 is YES, if determining that a result of step S51 is YES, or if determining that a result of step S21 is NO, on the other hand, the processing unit 112d of the mobile terminal 100d performs step S24.

5-3. Advantageous Effects

With a method for recognizing a speech sound according to the present embodiment, a noise level around the mobile terminal 100d is measured, the fifth determination for determining whether the measured noise level is higher than the certain noise level is made, and if it is determined as a result of the fifth determination that the noise level is higher than the certain noise level, the first determination and the translation process are not performed. If the noise level is equal to or lower than the certain noise level, the first determination and the translation process are performed. By not performing the first determination and the translation process when noise is detected, erroneous translation can be reduced.

Sixth Embodiment

Next, a sixth embodiment will be described with reference to FIGS. 15 and 16.

6-1. Configuration

Figure 15:
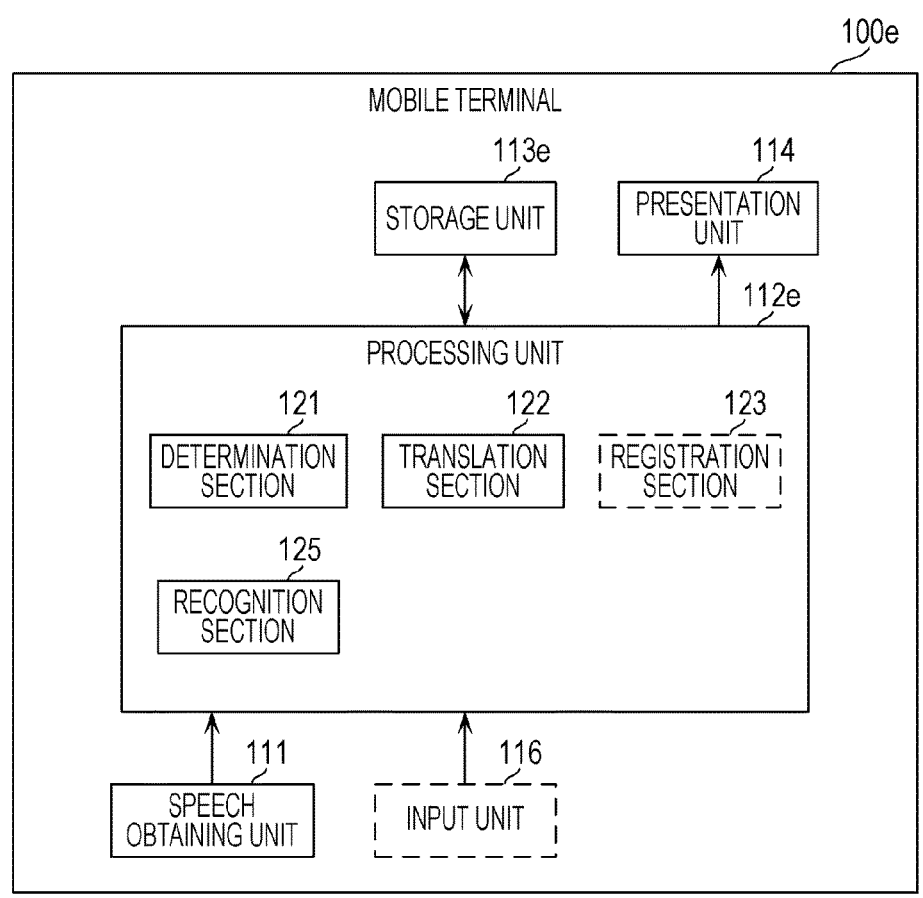
FIG. 15 is a block diagram illustrating an example of the functional configuration of a mobile terminal according to a sixth embodiment.

FIG. 15 is a block diagram illustrating an example of the functional configuration of a mobile terminal 100e according to the sixth embodiment.

As illustrated in FIG. 15, in the sixth embodiment, unlike in the first embodiment, the mobile terminal 100e performs all the processes included in the method for recognizing a speech sound. That is, the mobile terminal 100e according to the sixth embodiment is different from the mobile terminal 100 according to the first embodiment in that a processing unit 112e includes a recognition section 125 that performs multilingual speech recognition, which is performed by the server 200 in the first embodiment. A storage unit 113e of the mobile terminal 100e stores the multilingual database described in the first embodiment. Since the mobile terminal 100e need not communicate with the server 200, the mobile terminal 100e need not include the communication unit 115.

Other components are the same as those according to the first embodiment. In the present embodiment, therefore, only the components different from those according to the first embodiment will be described, and description of the same components as those according to the first embodiment is omitted. In the present embodiment, the same components as those according to the first embodiment are given the same reference numerals as in the first embodiment.

The recognition section 125 performs the same operation as the recognition unit 212 of the server 200 according to the first embodiment, and detailed description thereof is omitted.

6-2. Operation

Figure 16:
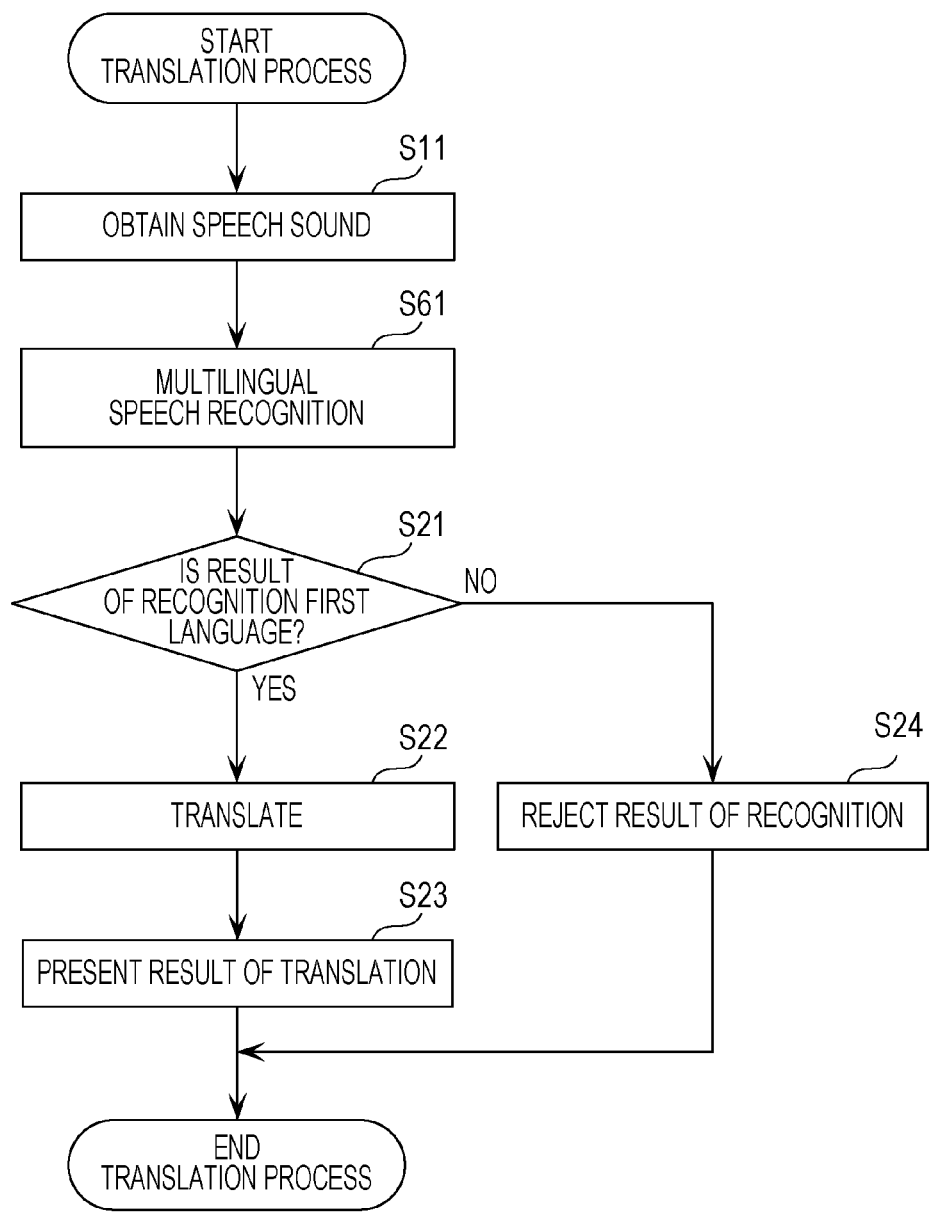
FIG. 16 is a flowchart illustrating an example of a translation process performed by the mobile terminal according to the sixth embodiment.

FIG. 16 is a flowchart illustrating an example of a method for recognizing a speech sound used by the mobile terminal 100*e* according to the sixth embodiment.

As illustrated in FIG. 16, the operation of the mobile terminal 100*e* according to the sixth embodiment is different from that of the translation system 1 according to the first embodiment in that the mobile terminal 100*e* performs all the processes. That is, in the sequence diagram of FIG. 5, steps S12, S13, S15, and S16 are omitted.

After a speech sound is obtained in step S11, the recognition section 125 of the mobile terminal 100*e* performs multilingual speech recognition in step S61.

After step S61, steps S21 to S24 are performed.

The mobile terminal 100*e* may thus perform the method for recognizing a speech sound by itself without causing the server 200 to perform multilingual speech recognition.

In the above embodiments, the components may be achieved by dedicated hardware or may be achieved by executing software programs corresponding to the components. Alternatively, the components may be achieved by a program execution unit, such as a central processing unit (CPU) or a processor, that reads and executes a software program stored in a recording medium such as a hard disk or a semiconductor memory. The software program for achieving the method for recognizing a speech sound according to one of the above embodiments is as follows.

That is, the program causes a computer to perform a process including obtaining speech information including a speech sound uttered by a user, recognizing a language of the speech sound included in the obtained speech information, making a first determination for determining whether the recognized language is a first language registered to a memory in advance, and translating, if it is determined as a result of the first determination that the recognized language is the first language, the speech sound into a second language, which is different from the first language.

Although the method for recognizing a speech sound according to one or a plurality of aspects of the present disclosure has been described on the basis of the above embodiments, the present disclosure is not limited to the embodiments. The one or plurality of aspects of the present disclosure may include modes obtained by modifying the embodiments in various ways conceivable by those skilled in the art and modes constructed by combining components in different embodiments with each other, insofar as the scope of the present disclosure is not deviated from.

The present disclosure is effective as a method for recognizing a speech sound, a mobile terminal, a program, and the like capable of avoiding recognition and translation of speech sounds uttered by persons other than a user of the mobile terminal.

What is claimed is:

1. A method, comprising:
    obtaining, using a microphone of a mobile terminal, speech information, including a speech sound uttered by a user;
    recognizing, using a server, a language of the speech sound included in the obtained speech information;
    detecting, using the mobile terminal, a position of the mobile terminal;
    making, using the mobile terminal, a first determination for determining whether the recognized language is a first language indicated by language information registered to a memory in advance, wherein when the recognized language is an official language of an area including the detected position, it is determined in the first determination that the recognized language is not the first language; and
    translating, using the mobile terminal, when it is determined as a result of the first determination that the recognized language is the first language, the speech sound into a second language, which is different from the first language.

2. The method according to claim 1, further comprising:
    receiving, using an input interface of the mobile terminal, the language information indicating the first language from the user; and
    registering the received language information to the memory,
    wherein the first determination is made after the registering.

3. The method according to claim 1, further comprising:
    making a second determination for determining whether the detected position is included in a second area of which an official language is different from the first language,
    wherein the second area is different from a first area of which an official language is the same as the first language, and
    wherein, when it is determined as a result of the second determination that the detected position is included in the second area, the official language of the second area is used as the second language in the translating.

4. The method according to claim 1, further comprising:
    obtaining notification information output from a certain application;
    making a second determination for determining on the basis of the detected position and the obtained notification information whether translation is necessary at a current position of the mobile terminal in a current state of the user; and
    performing, when it is determined as a result of the second determination that translation is necessary at the current position of the mobile terminal in the current state of the user, the first determination and the translation.

5. The method according to claim 4,
    wherein a place where translation is necessary is an airport, a hotel, a restaurant, a store, or a station.

6. The method according to claim 4,
    wherein it is determined in the second determination that translation is necessary at the current position of the mobile terminal in the current state of the user (1) when the detected position is an airport and the obtained notification information indicates that the user has checked in at the airport, (2) when the detected position is a hotel and the obtained notification information indicates that the user has checked in at the hotel, (3) when the detected position is a restaurant or a store and the obtained notification information indicates that the user has checked a coupon at the restaurant or the store, or (4) when the detected position is a station and the obtained notification information indicates that the user has gone through a gate at the station.

7. The method according to claim 1, further comprising:
detecting acceleration of a mobile terminal;
making a second determination for determining on the basis of the detected acceleration whether the user carrying the mobile terminal is moving at a certain speed or higher; and
performing, when it is determined as a result of the second determination that the user is not moving at the certain speed or higher, the first determination and the translation.

8. The method according to claim 1, further comprising:
measuring a noise level around a mobile terminal;
making a second determination for determining whether the measured noise level is higher than a certain noise level; and
performing, when it is determined as a result of the second determination that the noise level is equal to or lower than the certain noise level, the first determination and the translation.

9. A mobile terminal, comprising:
a microphone;
a processor; and
a memory,
wherein the processor
extracts speech information, including a speech sound uttered by a user from sounds collected by the microphone,
causes a server to recognize a language of the speech sound included in the extracted speech information, wherein the server is connected to the mobile terminal,
detects a position of the mobile terminal,
makes a first determination for determining whether the recognized language is a first language indicated by language information registered to the memory in advance, wherein when the recognized language is an official language of an area including the detected position, it is determined in the first determination that the recognized language is not the first language, and
translates, when it is determined as a result of the first determination that the recognized language is the first language, the speech sound into a second language, which is different from the first language.

10. A non-transitory recording medium, storing a program for causing a computer to perform a process, comprising:
extracting speech information, including a speech sound uttered by a user from sounds collected by a microphone;
causing a server to recognize a language of the speech sound included in the extracted speech information, wherein the server is connected to the computer;
detecting a position of the computer;
making a first determination for determining whether the recognized language is a first language indicated by language information registered to a memory of the computer in advance, wherein when the recognized language is an official language of an area including the detected position, it is determined in the first determination that the recognized language is not the first language; and
translating, when it is determined as a result of the first determination that the recognized language is the first language, the speech sound into a second language, which is different from the first language.

* * * * *